US008490082B2

(12) United States Patent
Moore et al.

(10) Patent No.: US 8,490,082 B2
(45) Date of Patent: Jul. 16, 2013

(54) SYSTEM AND METHOD FOR REPRESENTING USER PROCESSES AS SOFTWARE PACKAGES IN A SOFTWARE PACKAGE MANAGEMENT SYSTEM

(75) Inventors: Matthew P. Moore, Palo Alto, CA (US); Jeremy A. Redburn, Somerville, MA (US); Frank Schwichtenberg, Matick, MA (US); Alyssa A. Wolf, Somerville, MA (US); Jeffrey Yasskin, Mountain View, CA (US); Benjamin J. Zeigler, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 2134 days.

(21) Appl. No.: 11/267,067

(22) Filed: Nov. 3, 2005

(65) Prior Publication Data
US 2007/0168956 A1    Jul. 19, 2007

(51) Int. Cl.
*G06F 9/445* (2006.01)
*G06F 9/44* (2006.01)

(52) U.S. Cl.
USPC .......................... 717/175; 717/120; 717/169

(58) Field of Classification Search
None
See application file for complete search history.

(56) References Cited

U.S. PATENT DOCUMENTS

| 5,384,910 | A | * | 1/1995 | Torres ........................... 715/810 |
| 5,634,058 | A | * | 5/1997 | Allen et al. .................... 717/163 |
| 6,715,144 | B2 | | 3/2004 | Daynes et al. |
| 6,963,908 | B1 | * | 11/2005 | Lynch et al. .................. 709/220 |
| 2000/0013939 | | | 1/2002 | Daynes et al. |
| 2003/0233490 | A1 | | 12/2003 | Blaser et al. |
| 2004/0015946 | A1 | | 1/2004 | Te'eni et al. |
| 2004/0060035 | A1 | | 3/2004 | Ustaris |
| 2004/0143830 | A1 | | 7/2004 | Gupton et al. |
| 2004/0216045 | A1 | | 10/2004 | Martin et al. |
| 2004/0230971 | A1 | | 11/2004 | Rachman et al. |
| 2004/0249689 | A1 | | 12/2004 | Naraki et al. |

\* cited by examiner

*Primary Examiner* — Li B Zhen
*Assistant Examiner* — Evral Bodden
(74) *Attorney, Agent, or Firm* — Fleit Gibbons Gutman Bongini & Bianco PL; Jon A. Gibbons; Thomas Grzesik

(57) ABSTRACT

A system, method, and computer program product for representing at least one of a user process and a system process as a software package in a software package management system. The method includes creating at least one package comprising at least one of a user process and a system process. The at least one package comprises a structure consistent with a software package so that the at least one package is able to be managed by a software package management system. The at least one package is stored on an information system via the software package management system.

20 Claims, 16 Drawing Sheets

| package name | package version | package size (kilobytes) | license cost (USD) | dependencies | conflicts |
|---|---|---|---|---|---|
| Application A | 1.0 | 400 | 4000 | Application X v>=3.5 System Capability A or System Capability Y | Application F v<1.0 |
| Application B | 0.9 | 380 | 4000 | Application C v=>4.0 Application D v=>7.0 | |
| ... | ... | ... | ... | ... | ... |
| ... | ... | ... | ... | ... | ... |
| Job X | 1.0 | 100 | N/A | Application A Job Z | Application B Job Y |
| Job Z | 1.0 | 100 | N/A | Application C | Application D v =>7.0 |
| ... | ... | ... | ... | ... | ... |
| ... | ... | ... | ... | ... | ... |
| System Capability A | 1.0 | 250 | N/A | ... | System Capability X |
| ... | ... | ... | ... | ... | ... |

*FIG. 11*

SYSTEM AND METHOD FOR REPRESENTING USER PROCESSES AS SOFTWARE PACKAGES IN A SOFTWARE PACKAGE MANAGEMENT SYSTEM

CROSS REFERENCE TO RELATED APPLICATIONS

This application is related to the inventor's application "SYSTEM AND METHOD FOR REPRESENTING SYSTEM CAPABILITIES AS SOFTWARE PACKAGES IN A SOFTWARE PACKAGE MANAGEMENT SYSTEM", Ser. No. 11/267,225, now abandoned, which was filed on the same day as the present application and commonly assigned herewith to International Business Machines Corporation. This related application is incorporated herein by reference in its entirety.

FIELD OF THE INVENTION

The present invention generally relates to the field of software package management systems, and more particularly relates to the installation, removal, and tracking of software packages that are managed by software package management systems.

BACKGROUND OF THE INVENTION

Many modern computing environments use some form of a software package management system to manage the lifecycle of software applications installed on the system. A software package management system is a collection of tools for automating the process of installing, upgrading, configuring, and removing software application packages from a computer. In computer systems that utilize software package management systems, software (e.g. an application), is distributed in packages usually compiled into a single file. A software package generally includes software files that are required for installation of the software and a mechanism that is implemented so that a user can install the software on a computer or later uninstall the software. Software packages also include a list of other software packages, known as dependencies, which are required for the software to run properly. Software package management systems organize all of the software packages installed on a system and maintain the usability of the software packages.

FIG. 1 illustrates a prior art method on a typical software package management system for installing a software package. The prior art software package management system, at step 102, performs a dependency check. If the required software packages are determined, at step 104, to be available then the management system performs, at step 108 a conflicts check for the software package to be installed. If a required software package is not available, or a conflict is determined, at step 110, an error message, at steps 106 and 112 respectively, is generated. Only if all required software packages are available and no conflicts exist does the management system, at step 114, carry out pre-install tasks. A pre-install script is used to run a script before the actual installation of the script. The software package management system, at step 116, manages configuration files of the software package and then, at step 118, unpacks the actual application files to their proper locations and set the correct owner and permissions. Post install tasks, at step 120, are carried out. For example, a post-install script is executed if any required tasks are needed to be completed such as starting up a daemon or registering the newly installed application. A software package database, at step 122, is updated with information regarding the installed software package.

Although software package management systems and software packages provide a useful system for distributing the software packages and also managing the software packages when installed on a system, both components have numerous drawbacks, problems, and shortcomings.

One problem with current software package management systems is that although these systems work well for describing complex dependencies of an software package and its conflicts with other software packages, the current use is restricted to static application information. The current software package management systems do not allow for the description of dynamic run-time information. Also, only the system and user processes that were running at a particular time are logged. Versions of dependencies such as libraries that were used, run-time command options, and more are not determined. An accurate replication of the system on which the job was executed is not created.

Yet another problem is that currently there is no general way for a software package manager to tell if it is safe to uninstall a program. The best that existing solutions can do is tell if a file, such as a DLL in Windows, is in active use, or use specific lock files to signify that an application is in use. This method is not very complete, meaning that current systems often get halfway through an uninstall before they hit a file that is in use, or do not know to even check the lock file.

Yet another problem is that traditional software package managers allow for installation, uninstallation, and tracking of the install-state of only applications and not user processes (jobs). Once applications are installed, there is no consistent method for executing user processes that take advantage of the installed applications. Furthermore, while today's computation jobs are becoming increasingly complex and interdependent, software package management systems only manage software packages and do not handle the dependencies between jobs and installable applications. Jobs often have complex dependencies and existing systems require the specification of specific files that must exist and the creation of an environment under which a job will run. Also, in many instances the results or output of a job are available, but the runtime state or application state of the system were when the job was executed is not known.

A further problem is that the software packages contain applications that are designed to run on a specific set of hardware and software, and must specify that in the software package's meta-information, often called the software package descriptor. Most packaging systems use a single string such as "x86", "mips" or "amd64" to represent the capabilities. Even a comprehensive scheme such as using the format "cpu-vendor-[kernel-]system" (i.e. "i686-pc-linux-gnu" or "i686-pc-cygwin") is still not sufficient. For example, there are other important settings that software packages could depend on, and it is difficult to extend the software package when new capabilities arise. Using a single string forces each system to adopt a predefined platform.

Currently, the only way a software package can test for capabilities not present in the platform string is to begin the install process and do the testing using platform-specific testing during the preinstall phase that are likely not portable and would need to be designed individually for each system. If the capabilities are not supported, the install process aborts. If the problem install is part of a series of installs, it may leave a system with many unnecessary software packages that were installed as prerequisites to the aborted software package.

Yet another problem is that systems that try to use packages to define an entire platform only use a single package that contains a file which holds the capabilities information. This capability information does not extend to the packaging system whereby other packages would depend on specific capabilities present on the system. This type of single package has the same problem as a string descriptor in that it is not easily extendable if a capability, either hardware or software, is added to a system. If the capabilities of multiple systems were to be combined such as the files system standard from Redhat, a Su5E kernel and the Debian packaging system, a single package that is non-reusable would need to be created with the prior art methods.

Therefore a need exists to overcome the problems with the prior art as discussed above.

SUMMARY OF THE INVENTION

Briefly, in accordance with the present invention, disclosed are a system, method, and computer program product on an information processing system product for representing at least one of a user process and a system process as a software package in a software package management system. The method includes creating at least one package comprising at least one of a user process and a system process. The at least one package comprises a structure consistent with a software package so that the at least one package is able to be managed by a software package management system. The at least one package is stored on an information system via the software package management system.

In another embodiment of the present invention a system for representing at least one of a user process and a system process as a software package in a software package management system. The system comprises a memory and an information processing system communicatively coupled to the memory. The system also comprises at least one package including at least one of a user process and a system process. The at least one package includes at least one requirement associated with the at least one of the user process and the system process. The at least one requirement identifies at least one of an application, another user process, and another system process required by the at least one of the user process and the system process. The system further comprises a software package management system that includes an installer for installing the at least one package on the information processing system. The software package management system also comprises a software package database for storing the at least one package. The software package database includes a set of entries for at least one of requirements and conflicts associated with the at least one of the user process and the system process.

In yet another embodiment of the present invention a computer program product for representing at least one of a user process and a system process as a software package in a software package management system. The computer program product includes creating at least one package comprising at least one of a user process and a system process. The at least one package comprises a structure consistent with a software package so that the at least one package is able to be managed by a software package management system. The at least one package is stored on an information system via the software package management system.

An advantage of the foregoing embodiments of the present invention is that user processes can be compiled into a package, thereby taking advantage of existing tools for managing packages. The prerequisites of a user process can be described as a set of dependencies that can be resolved by existing package managers.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 11 illustrates an exemplary package database according to an embodiment of the present invention;

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to an embodiment, overcomes problems with the prior art by providing user processes in a software package format allowing, among other things, information about versions of dependencies such as libraries that were used, run-time command options, and the like to be provided in a software package database. Also, describing system capabilities/resources in a software package format allows a software package to be extendable if a new capability is added and allows for a more complete specification of the hardware and software that the software was designed to run on. Additionally, the present invention allows for much finer-grained dependencies in the dependency resolution stage as opposed to runtime checks for capabilities during the install step.

Exemplary System

Figure 2:
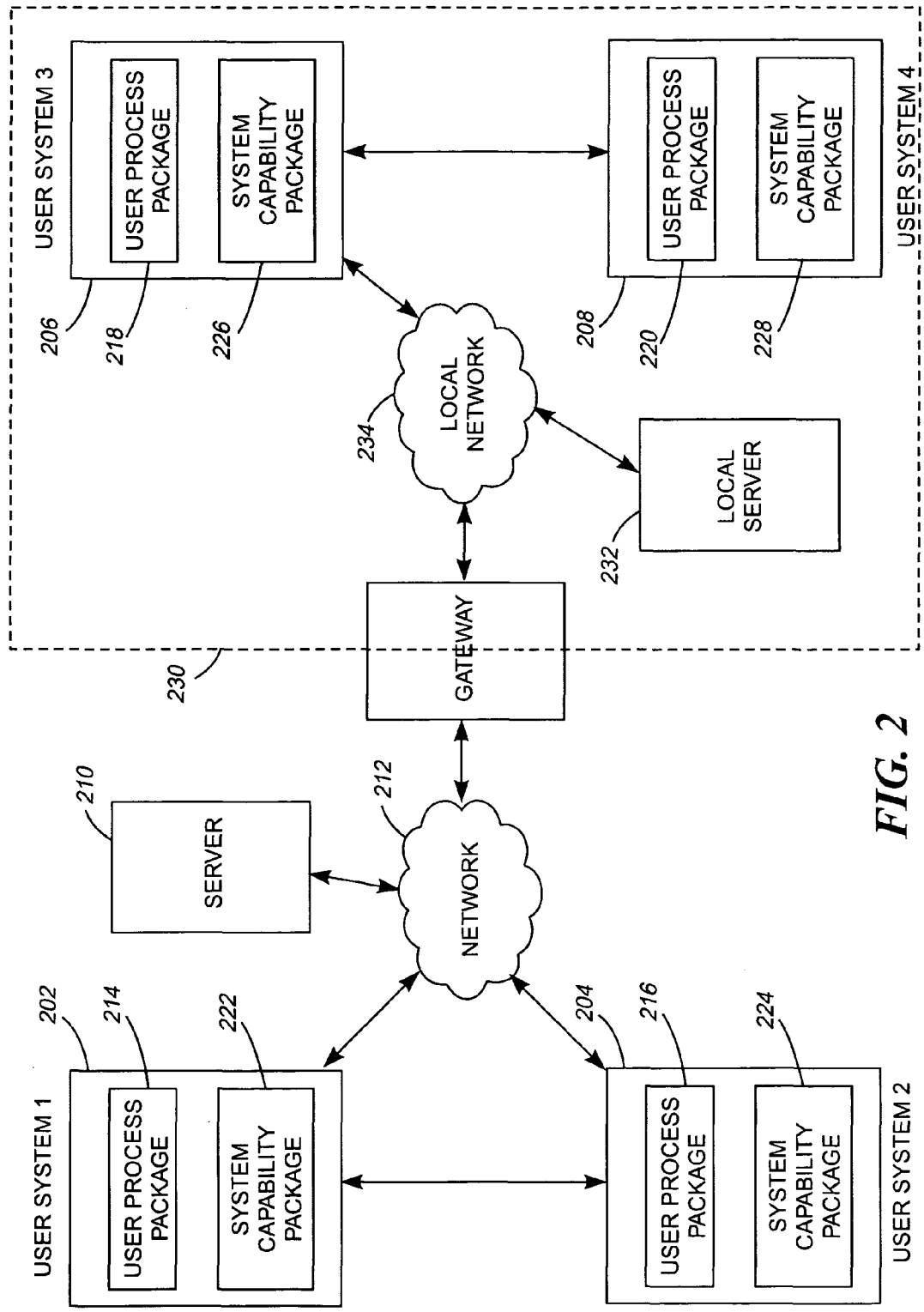
FIG. 2 is a block diagram illustrating an exemplary system according to an embodiment of the present invention.

According to an embodiment of the present invention, as shown in FIG. 2, an exemplary system 200 is illustrated. FIG. 2 shows a system 200 comprising at least one user system 202, 204, 206, 208. User system1 202 and user system2 204 communicate with at least one server 210 through a network 212. The network 212, according to one embodiment, is a LAN, WAN, World Wide Web, wired, wireless network, or the like. In an alternative embodiment, user system1 202 and user system2 204, are standalone systems and are not connected to the network 212. In another embodiment, user system1 202 and user system2 204 are connected directly to each other by IR, wired, wireless, Bluetooth or any other similar means that is known in the art.

Figure 3:
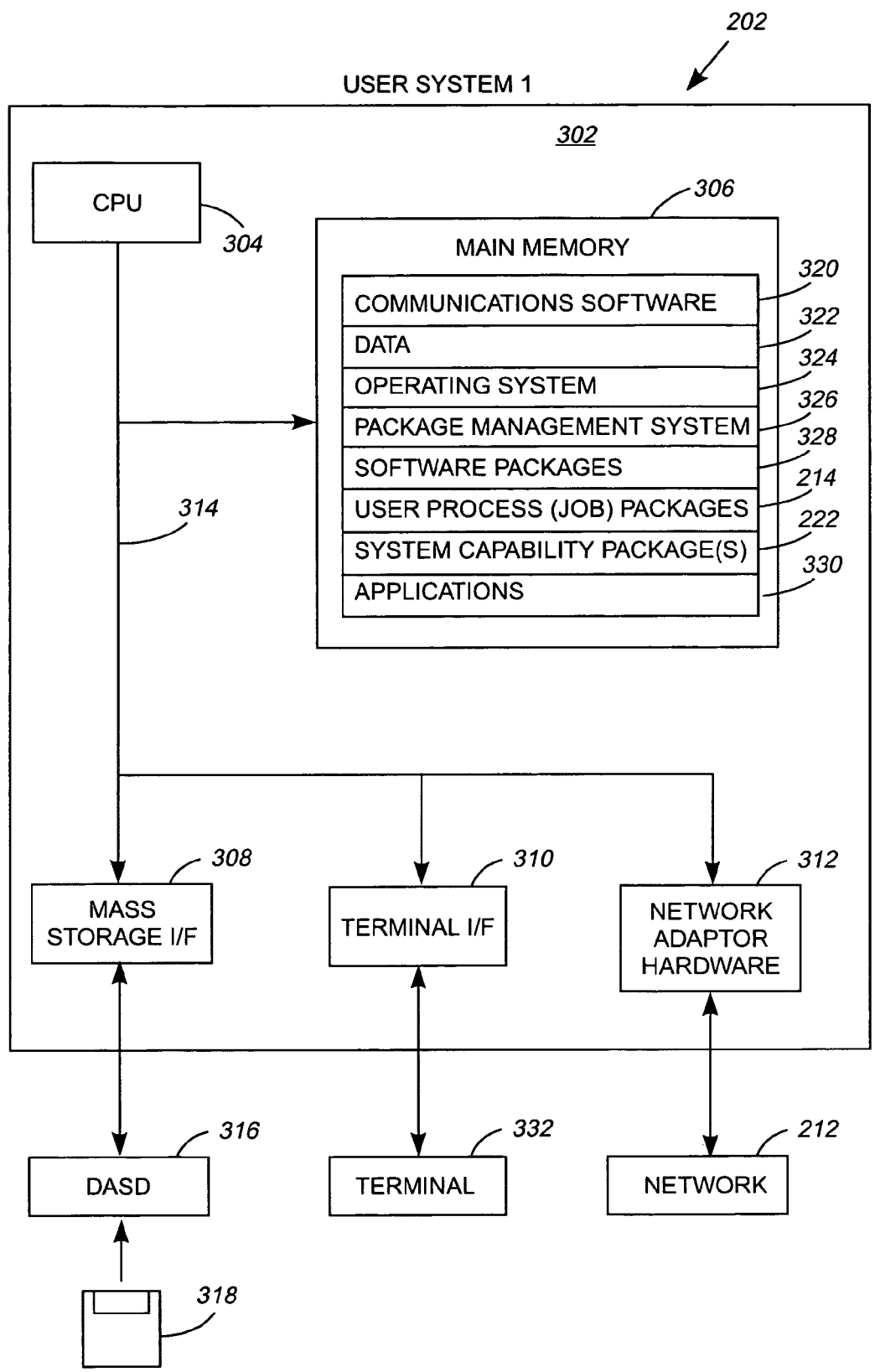
FIG. 3 is a block diagram illustrating a user system according to an embodiment of the present invention.

The user system1 202 and user system2 204 include, in one embodiment, at least one user process (job) package 214, 216 and/or a system capability package 222, 224. The users systems 202, 204 also include a software package 328 (FIG. 3). The user process package 214, system capability package 222, and software package 328 (FIG. 3) will be discussed in greater detail below. Also, the user system1 202 and user system2 204, in one embodiment, also include a system process package (not shown). In the following paragraphs were user process packages are discussed, the discussion is also applicable to system process packages.

In one embodiment, the system 200 comprises a group of user systems 206, 208. The group 230, for example, is a work group, home network group, gaming network group, computing cluster, or the like. Each group user system 206, 208 communicates with at least one local server 232 through a local network 234. The local network 234, for example, is an intranet. The group user systems 206, 208 also communicate with the network 212 through a gateway 236. Each group user system 206, 208 includes at least one user process (job) package 218, 220 and/or a system capability package 226, 228, each will be discussed in greater detail below. In an alternative embodiment, the server 210 and the local server 232 also include at least one user process (job) package (not shown) and/or a system capability package (not shown).

Exemplary User System

FIG. 3 is a block diagram illustrating a more detailed view of the user system1 202 according to an embodiment of the present invention. Although the following discussion is with respect to user system1 202, the discussion is also applicable to the other user system 204, group user system 206, 208, server 210, and local server 232, as shown in FIG. 2. The user system1 202 is based upon a suitably configured processing system adapted to implement the exemplary embodiment of the present invention. Any suitably configured processing system is similarly able to be used as user system1 202 by embodiments of the present invention, for example, a personal computer, workstation, PDA or the like. The user system1 202 includes a computer 302. The computer 302 has a processor 304 that is connected to a main memory 306, mass storage interface 308, terminal interface 310, and network adapter hardware 312. A system bus 314 interconnects these system components. Mass storage interface 308 is used to connect mass storage devices, such as data storage device 316, to the user system1 202. One specific type of data storage device is a computer readable medium such as a floppy disk drive, which may be used to store data to and read data from a floppy diskette 318 or CD (not shown). Another type of data storage device is a data storage device configured to support NTFS type file system operations.

The main memory 306 contains communications software 320, data 322, an operating system(s) image 324, software package management system(s) 326, software package(s) 328; user process package(s) 214, system capability package(s) 222, and application(s) 330. In one embodiment, any combination of packages 326, 214, 222 exist in the main memory 306. The application 330, for example, is running or waiting to be executed. Although illustrated as concurrently resident in the main memory 306, it is clear that each respective component of the main memory 306 are not required to be completely resident in the main memory 306 at all times or even at the same time. In one embodiment, the user system1 202 utilizes conventional virtual addressing mechanisms to allow programs to behave as if they have access to a large, single storage entity, referred to herein as a computer system memory, instead of access to multiple, smaller storage entities such as the main memory 306 and data storage device 316. Note that the term "computer system memory" is used herein to generically refer to the entire virtual memory of the user system1 202.

Although only one CPU 304 is illustrated for computer 302, computer systems with multiple CPUs can be used equally effectively. Embodiments of the present invention further incorporate interfaces that each includes separate, fully programmed microprocessors that are used to off-load processing from the CPU 304. Terminal interface 312 is used to directly connect one or more terminals 332 to computer 302 to provide a user interface to the user system1 202. These terminals 332, which are able to be non-intelligent or fully programmable workstations, are used to allow system administrators and users to communicate with the user system1 202. The terminal 332 is also able to consist of user interface and peripheral devices that are connected to computer 302 and controlled by terminal interface hardware included in the terminal I/F 312 that includes video adapters and interfaces for keyboards, pointing devices, and the like.

The operating system 324 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system 324 to be executed on any processor located within the user system1 202 or in an alternative embodiment within the group user systems 206, 208.

The network adapter hardware 314 is used to provide an interface to the network 212 and/or the local network 234. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 318, CD ROM, or other form of recordable media, or via any type of electronic transmission mechanism.

Exemplary Software Package Management System

Figure 4:
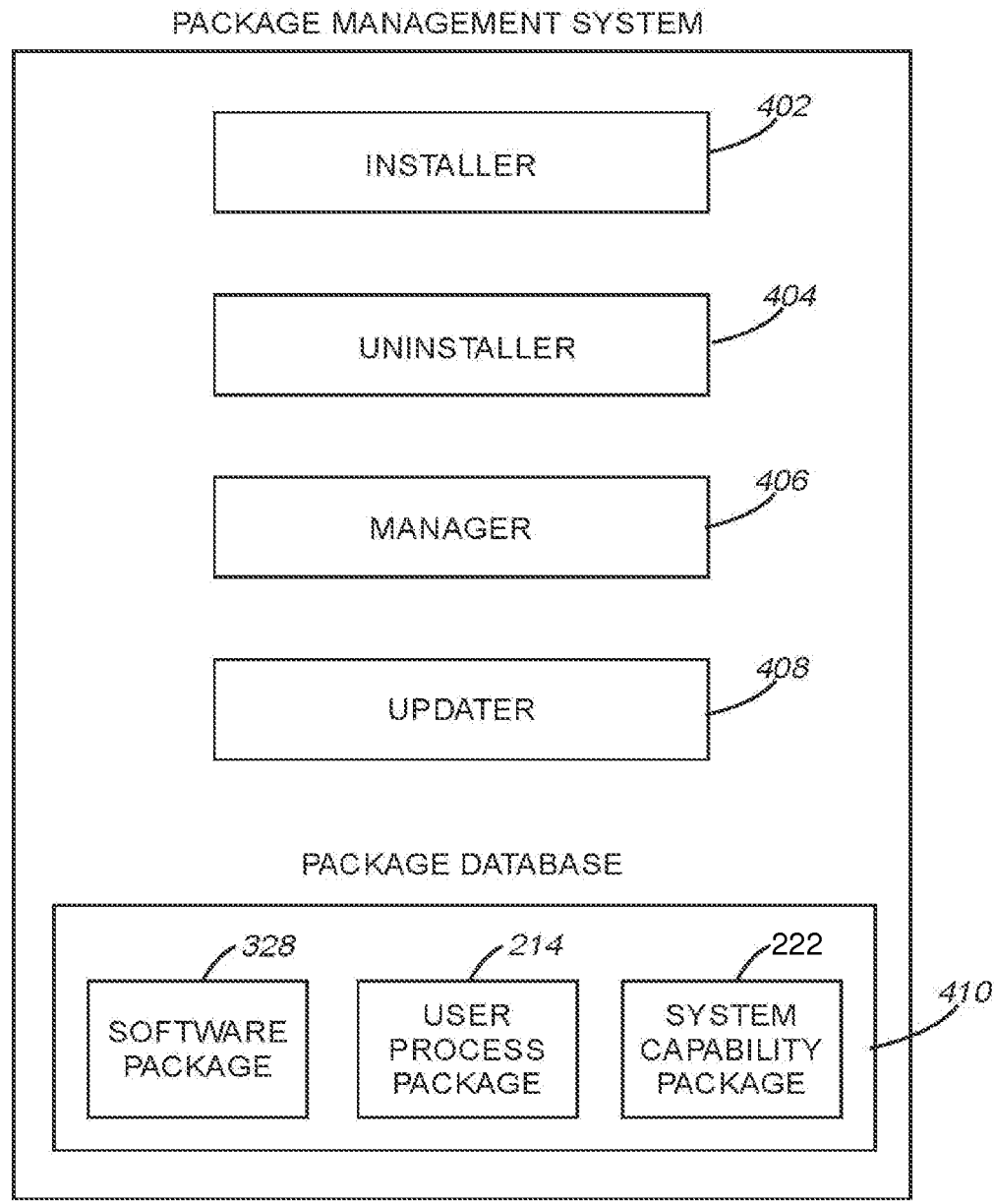
FIG. 4 is a block diagram illustrating a software package management system according to an embodiment of the present invention.

FIG. 4 shows a more detailed view of the software package management system 326 of FIG. 3. The components of the software package management system 326 may vary and the following is a general non-limiting description of the software package management system 326. The software package management system 326 comprises a software package installer 402 for installing the content of a package 214, 222, 328 and performing actions associated with the installation procedure. The software package management system 326 also includes a package uninstaller 404 for uninstalling packages 214, 222, 328 and performing actions associated with the uninstallation procedure. A software package manager 406 manages the installed packages 214, 222, 328 and a software package updater 408 performs any updates that are available for the installed packages 214, 222, 328. The software package management system 326 also comprises a software package database 410 for storing the installed packages 214, 222, 328.

Exemplary Software Package

Figure 5:
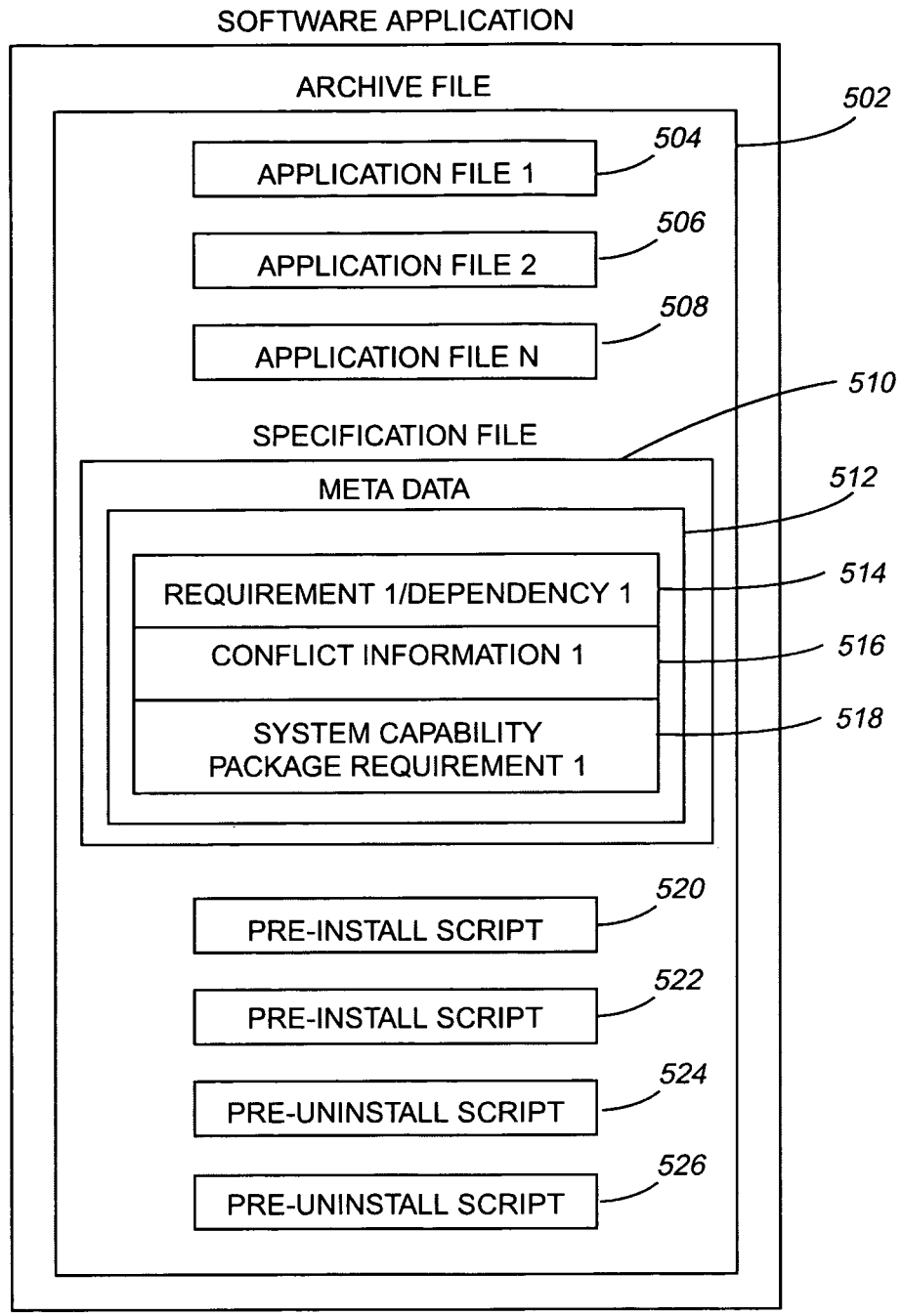
FIG. 5 is a block diagram illustrating an exemplary software package according to an embodiment of the present invention.

FIG. 5 shows a more detailed view of an exemplary software package 328 according to an embodiment of the present invention. FIG. 5 shows a software package 328 comprising an archive file 502. The archive file 502 comprises application files 504, 506, 508 that are to be installed and a specification file 510. The specification file 510 describes the software package and its requirements/dependencies. The metadata 512 of the specification file 510, for example, includes a summary of the software to be installed, the version of the software package 328, the name of the entity that created the software package, and the like. The metadata 512 also includes a list of requirement/dependencies for the software package 328. For example requirement1/dependency1 514, lists other software packages that need to be installed for the software package 328 to function properly. The specification file 510 also includes conflict information 516 and system capability package requirements 518. The conflict information 514, for example, lists other software packages that if running or installed will cause the installation of the software package 328 to fail. The system capability package requirement(s) 518 lists the system capability package(s) needed for the software to be installed.

The archive file 502 also includes optional pre-install script 520, post-install script 522, pre-uninstall script 524, and post-uninstall script 526. The optional pre-install script 520 allows a script to be executed before the actual installation of the software package 328. For example, the optional pre-install script 520 can be used to run a script for checking the GNU Privacy Guard ("GPG") signature of the software package to verify that the software package 328 has not been tampered with. The optional post-install script 522, for example, allows for the completion of any required task that needs to be completed after installation such as starting up a daemon or registering the newly installed application. The optional pre-uninstall and post-uninstall scripts 524, 526 allow, for example, the cleanup of any files no longer need prior to uninstalling the application and after uninstalling the application.

Exemplary User Process (Job) Package

Figure 1:
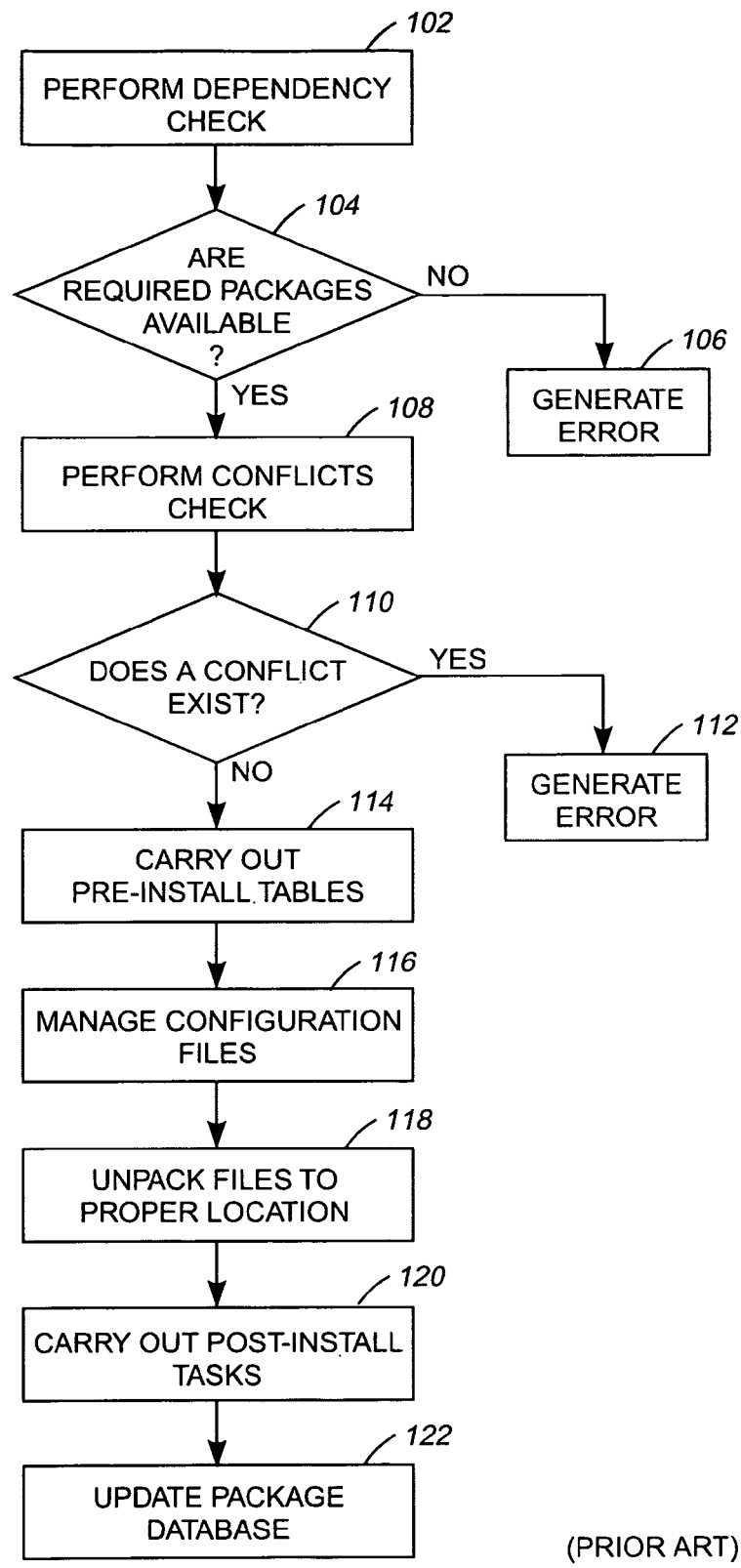
FIG. 1 is an operational flow diagram showing a prior art process of installing a software package.
Figure 6:
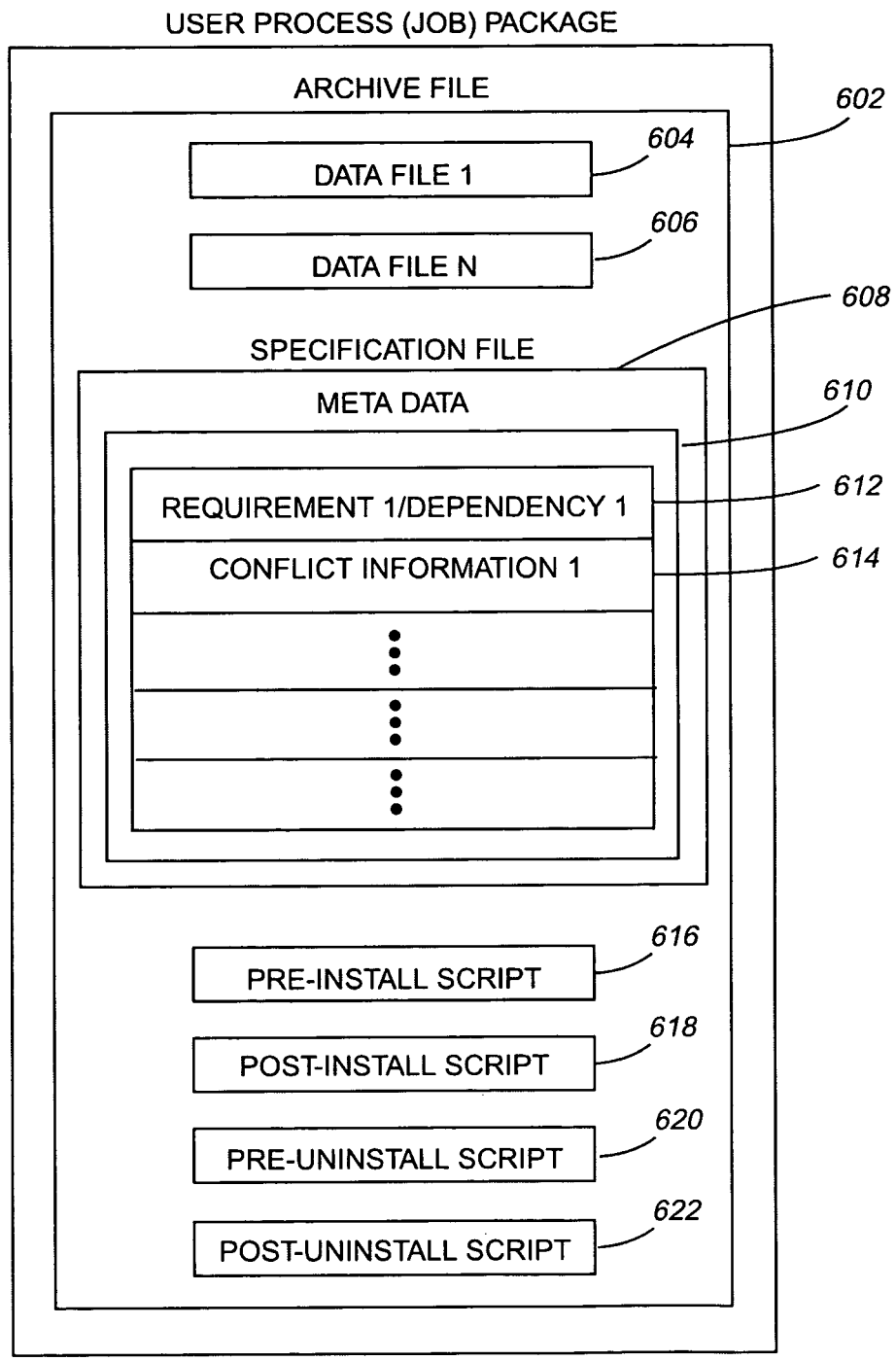
FIG. 6 is a block diagram illustrating an exemplary system/user process package according to an embodiment of the present invention.

FIG. 6 shows a more detailed view of the user process package 214. Although the following discussion is with respect to the user process package 214 of user system1 202, the discussion is also applicable to the other user process packages 216, 218, 220, as shown in FIG. 1. FIG. 6 shows a user process package 214 including an archive file 602. A user process (job) is an instantiation of an application. For example, the user process package 214 may be for running the application installed from the software package 328 discussed above with respect to FIG. 5. In another embodiment, a user process is a long-running process referred to as a "batch job" that is packaged into the user process package 214. A user process or job is submitted by the user of the system or by the system itself. The archive file 602 includes data files 604, 606 needed by the user process to run properly.

The archive file 602 also includes a user process specification file 608. The user process specification file 608 describes the user process package 214 and its requirements/dependencies. The metadata 610 of the user process specification file 608, in one embodiment, includes a summary of the user process to be installed, the version of the user process package 214, the name of the entity that created the user process package 214, and the like. The metadata 610 also includes a list of requirement/dependencies for the user process package 214. For example, requirement1/dependency1 612 lists other user process packages and software packages that need to be available (either already installed and or running) for the user process package 214 to function properly. Therefore, inter-dependencies are created between the user process packages and the software packages. The user process specification file 608 also includes conflict information 614. The conflict information 614, for example, lists other user process packages and software packages that if running or installed will cause the installation process of the user process package 214 to fail.

The archive file 602 also includes optional pre-install script 616, post-install script 618, pre-uninstall script 620, and post-uninstall script 622. The optional pre-install script 616 allows a script to be executed before the actual installation of the user process package 214 for performing any basic setup necessary for the user process to run. For example, the optional pre-install script 616 can be used to run a script for creating directories, setting environment variables, copy required files, checking the GPG signature of the user process package 214, and the like. The optional post-install script 618, for example, generates a script for the system's scheduler to begin execution of the installed user process. The optional post-install script 618 also triggers the uninstallation procedure for the user process. The optional pre-uninstall and post-uninstall scripts 620, 622 allow, for example, the cleanup of any files no longer need prior to uninstalling the user process and after uninstalling the user process.

The format and contents of the user process package 214 and the software package 328 are similar as can be seen from the above discussion. Therefore, a user process, according to an embodiment of the present invention, can be handled and managed by existing software package management systems such as the software package management system 326.

Representing user process/jobs as software packages alongside applications allows the advantages of existing tools for managing software packages to be utilized with respect to user processes. Additionally, the prerequisites of a user process can be described as a set of dependencies that can be resolved by existing software package managers. Integrating the metadata of software packages and user processes allows the user process requirements to be described as a set of software packages or as other jobs. This provides an efficient way for determining whether a user process's requirements have been met. Missing programs or jobs can be determined and identified. Additionally, dynamic run-time information can now be described and managed by existing software package management systems such as software package management system 326.

Providing user processes as software package structure also allows for the replication of the run-time environment. For example, if a user process is compiled into a package comprising a software package structure and the changes in the software package database 410 are logged, a user can get a status snapshot of what was running on the system at any given time. Information about versions of dependencies such as the libraries that were used, run-time command options, and the like is able to be provided in the software package database 410 because the user process is represented as a package consistent with the structure of a software package. With this information it is possible to replicate the system on which the user process was executed.

Exemplary System Capability Package

Figure 7:
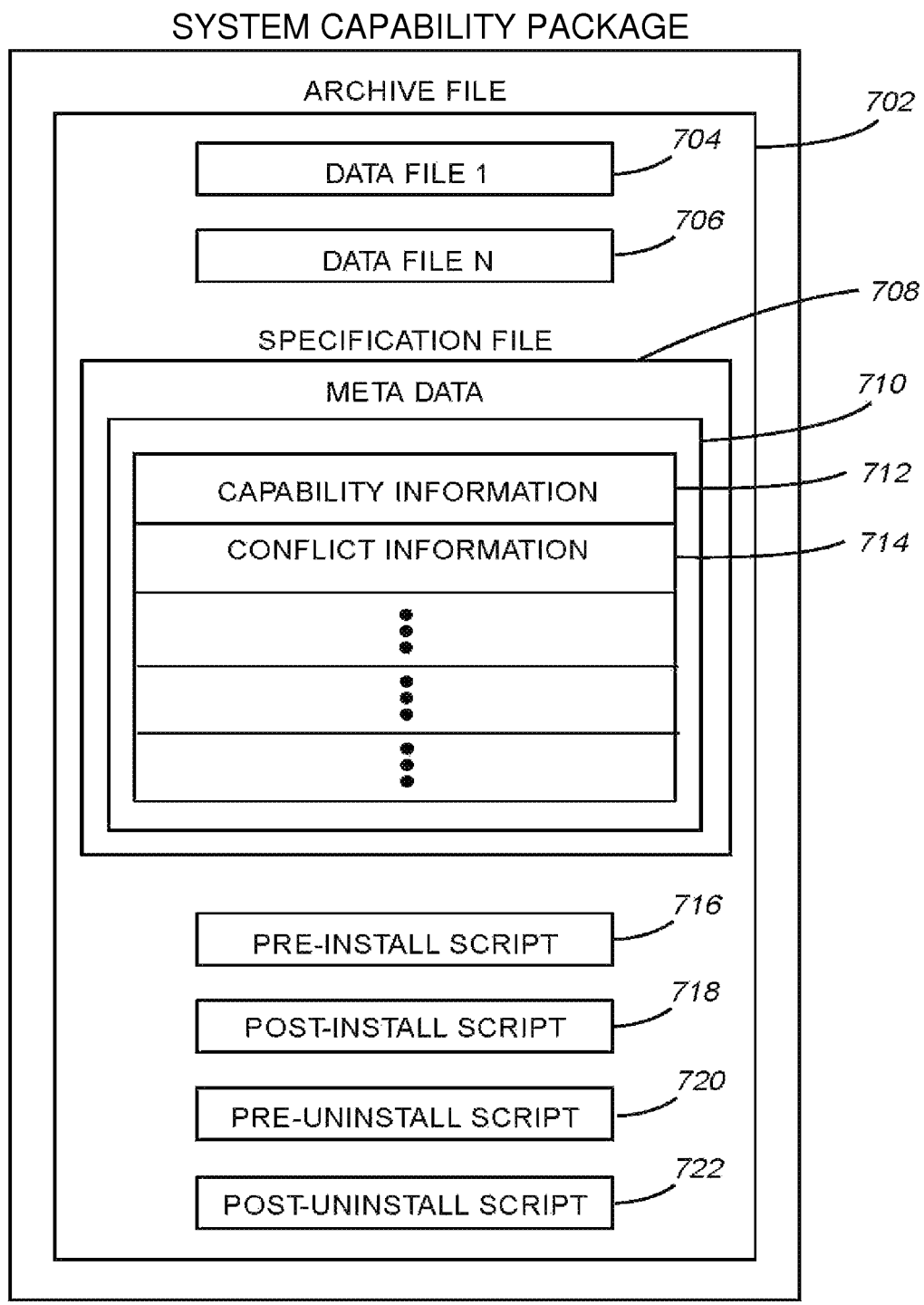
FIG. 7 is a block diagram illustrating an exemplary system capability package according to an embodiment of the present invention.

FIG. 7 shows a more detailed view of the system capability package 222. Although the following discussion is with respect to the system capability package 222 of the user system1 202, the discussion is also applicable to the other system capability packages 224, 226, 228, as shown in FIG. 2. A system capability package 222, for example, represents a specific platform used or system resource needed to run the software installed from the software package 328. For example, the system capability package 222 represents virtual machines, processor instruction sets, file system layouts, APIs, and the like. Also, in one embodiment, the system capability package 222 is a virtual package. FIG. 7 shows a system capability package 222 including an archive file 702.

The archive file 702 includes a specification file 708. The specification file 708 describes the system capability package 222 and its requirements/dependencies. The metadata 710 of the system capability specification file 708, in one embodiment, includes a summary of the system capability represented by the system capability package 222, the version of the system capability package 222, the name of the entity that created the system capability package 222, and the like. The metadata 710 also includes a list of requirement/dependencies (not shown) for the system capability package 222. The capability information 712 identifies the system capabilities described by the system capability package 222. The system capability specification file 708 also includes conflict information 714. The conflict information 714, for example, lists other system resources that if running or existing on the present system will cause the installation of the system capability package 222 to fail.

The archive file 702 also includes optional pre-install script 716, post-install script 718, pre-uninstall script 720, and post-uninstall script 722. The following are non-limiting examples of exemplary functions of the optional pre-install script 716, post-install script 718, pre-uninstall script 720, and post-uninstall script 722. The optional pre-install script 716, in one embodiment, allows a script to be executed before the actual installation of the system capability package 222 for performing any basic setup necessary for the installation. For example, the optional pre-install script 716 can be used to run a script for creating directories, setting environment variables, copy required files, checking the GPG signature of the system capability package 222, and the like. The optional post-install script 718, in one embodiment, allows for the completion of any required task that needs to be completed after installation. The optional pre-uninstall and post-uninstall scripts 720, 722, in one embodiment, the cleanup of any files no longer needed prior to uninstalling the system capability package 222 and after uninstalling the system capability package 222.

The format and contents of the system capability package 222 and the software package 328 are very similar. In other words, the system capability package 222 has a structure consistent with the structure of the software package 328, as can be seen from the above discussion. Therefore, system capability package 222, according to an embodiment of the present invention, can be handled and managed by existing software package management systems.

One advantage of describing system resources such as hardware and software capabilities in packages is that string descriptions specifying the hardware and/or software that the software is designed to run on is no longer required. String descriptions do not provide for a complete picture of what a software package depends on. Also, string descriptions are difficult to extend when new capabilities arise. For example, a system may support POSIX and various extensions or Win32 or .NET. A system's file system layout may be patterned, for example, on Redhat's, BSB's, or the Linux Standard Base's. A string description in a software package does not account for these other capabilities that a software package may depend on. The system capability package(s) 222, according to the present invention, is extendable if a new capability is added and allows for a more complete specification of the hardware and software that the software was designed to run on.

Another advantage of the system capabilities package 222 of the present invention is that optimized targeted installation of software packages is achieved because a system is not forced to adopt a predefined (by a string description) platform. For example, if a new emulator is developed for an i686 machine that supports the MIPS instruction set and string description of system capabilities is used, a new architecture such as i686+MIPS would have to de defined. The software package management tools would need to be recoded to accept this new architecture. However, if architecture is handled using system capability packages, an existing MIPS architecture package only needs be downloaded and installed to the software package database 410 alongside an existing i686 system capability package.

Additionally, if the capabilities of multiple systems, for example, the file system standard from Redhat, a SuSE kernel, and the Debian packaging system were to be combined, a single package would need to be created that is non-reusable. However, by implementing system capability package(s) of the present invention, system capability packages would exist for each of these capabilities and can be installed alongside each other to define the system's platform.

Exemplary Software Package Specification File

Figure 8:
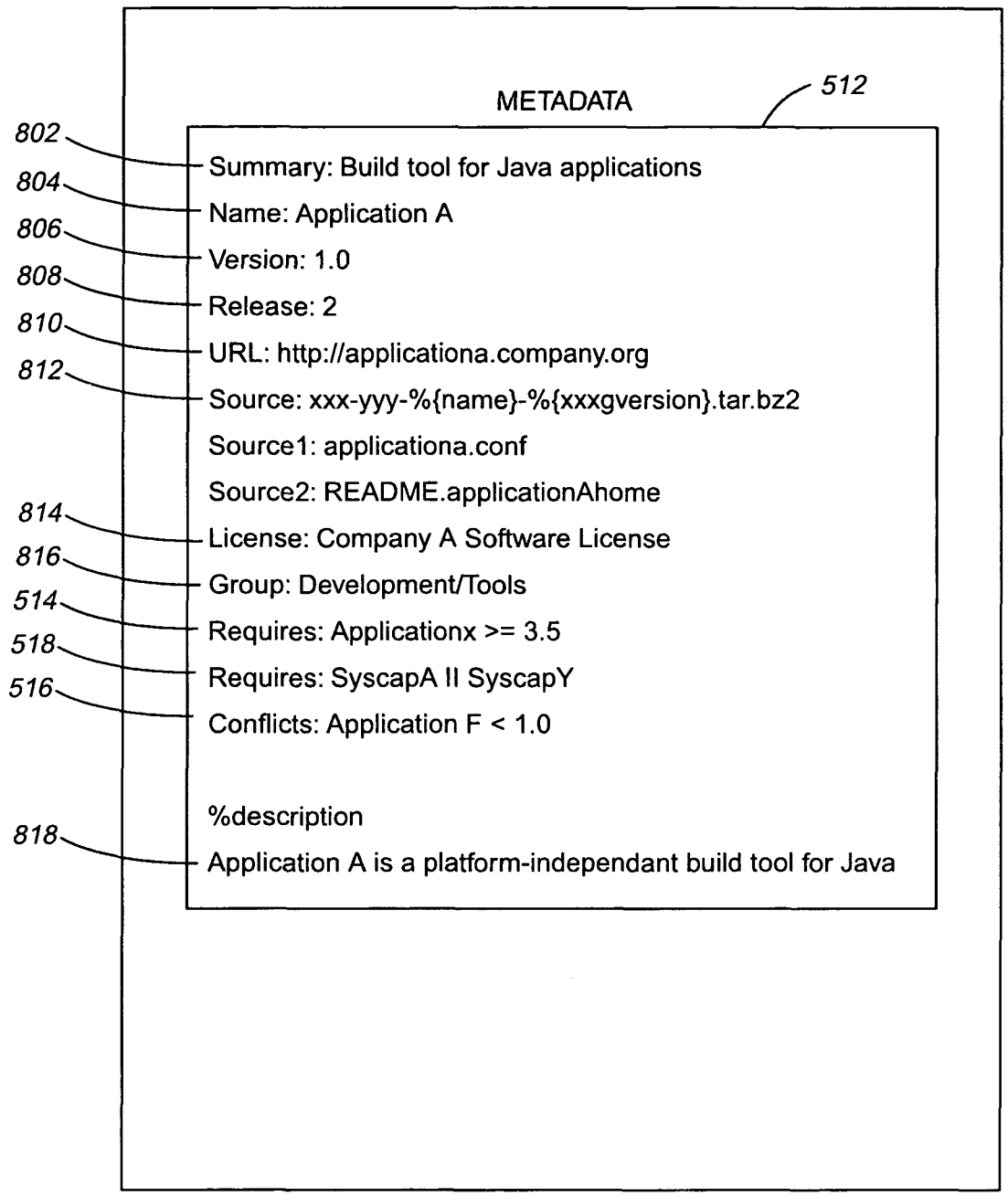
FIG. 8 illustrates a more detailed view of a specification file in the software package of FIG. 5 according to an embodiment of the present invention.

FIG. 8 shows the software package specification file 510 in more detail. FIG. 8 shows exemplary metadata 512 for the software package 328. The information in the specification file 510 of FIG. 8 is only an exemplary portion of the information included in a specification file and is not exhaustive. The metadata 512 includes summary information 802, which gives a short description of the packaged software. The name information 804 defines what the software package will actually be called. The version information 806 is the version of the software being packaged and the name release information 808 represents the number of times the software, at the present version, has been packaged. Also included are URL and source information 810, 812. The URL 810 information points to documentation for the software being packaged and the source information 812 provides the source filename to the software package management system 326.

The metadata 512 also includes licensing information 814, which describes the type of license that is associated with the software to be installed. Group information 816 is also included, which defines how the packaged software should be group with other software packages. The metadata 512 also includes requirement1/dependency1 information 514. The requirement1/dependency1 information 514, as discussed above with respect to FIG. 5, lists software packages and their versions (if applicable) needed for the current software package 328 to be installed properly. For example, for the software package 328 to install properly Application X with a version greater or equal to 3.5 needs to be installed. The metadata 512 also includes conflict information 516. The conflict information 516, as described above with respect to FIG. 5, lists any software and its version (if applicable) that if running and/or installed will cause the installation of the software package 328 to fail. For example, if Application F with a version below 1.0 is installed and/or running, the software package 328 will not install.

A system resource package requirement(s) 518 is also included in the metadata 512, which lists any hardware or software capabilities needed for the software to function properly. For example, the system capability package requirement(s) 518 states that a System Capability A package (SyscapA) or a System Capability Y (SyscapY) package needs to be available for the software to function properly. Description information 818, which describes the software and its functions in more detail, is also included in the metadata 512. The System Capability A package and the System Capability Y package, for example, can be packages for the Sun SPAC (sparc), i386, Power PC (ppc) platforms or the like.

Exemplary User Process (Job) Package Specification File

Figure 9:
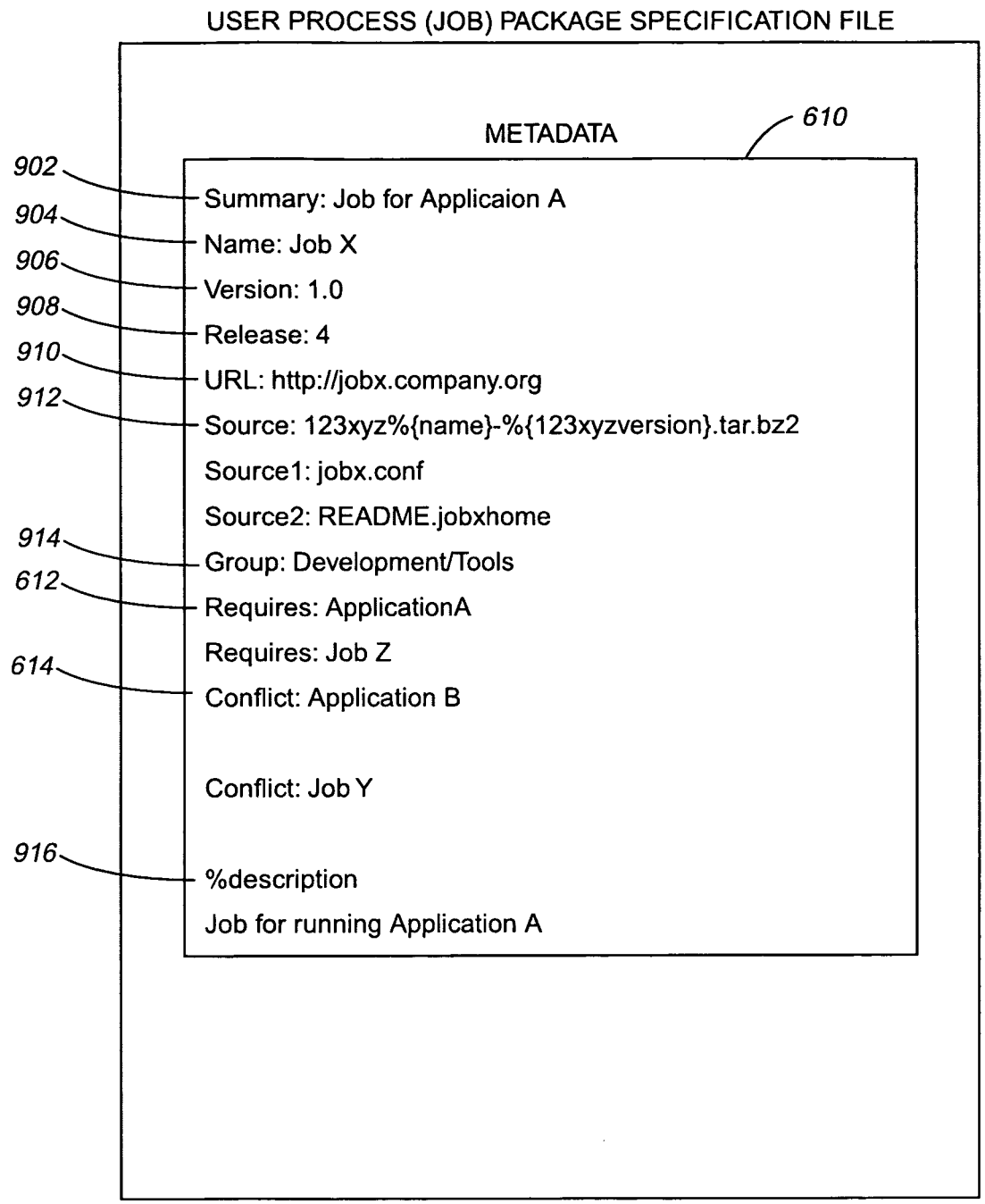
FIG. 9 illustrates a more detailed view of a specification file in the user process package of FIG. 6 according to an embodiment of the present invention.

FIG. 9 shows the user process (job) package specification file 608 in more detail. FIG. 9 shows exemplary metadata 608 for the user process package 214. The information in the user process specification file 608 of FIG. 9 is only an exemplary portion of the information included in the user process specification file 608 and is not exhaustive. Additionally, the metadata 610 can also vary and is not limited to the foregoing embodiments. The metadata 610 includes summary information 902, which gives a short description of the packaged user process. The name information 904 defines what the user process package 214 will actually be called. The version information 906 is the version of the user process and the name release information 908 represents the number of times the user process, at the present version, has been packaged. Also included are URL and source information 910, 912. The URL 910 information points to documentation for the user process being packaged and the source information 912 provides the source filename to the software package management system 326.

The metadata 610 also includes group information, which defines how the packaged user process should be grouped with other packages. The metadata 610 also includes requirement1/dependency1 information 612. The requirement1/dependency1 information 612, as discussed above with respect to FIG. 6, lists software packages and their versions (if applicable) needed for the proper execution of the user process. For example, for the user process to run properly, Application A needs to be installed. The metadata 608 also includes conflict information 614. The conflict information 614, as described above with respect to FIG. 6, lists any software and its version (if applicable) or other user process that if running and/or installed will cause the installation of the of the user process to fail. For example, if Application B or Job Y is installed and/or running, the user process package 214 will not install. Description information 916, which describes the software and its functions in more detail, is also included in the metadata 608.

Exemplary System Capability Package Specification File

Figure 10:
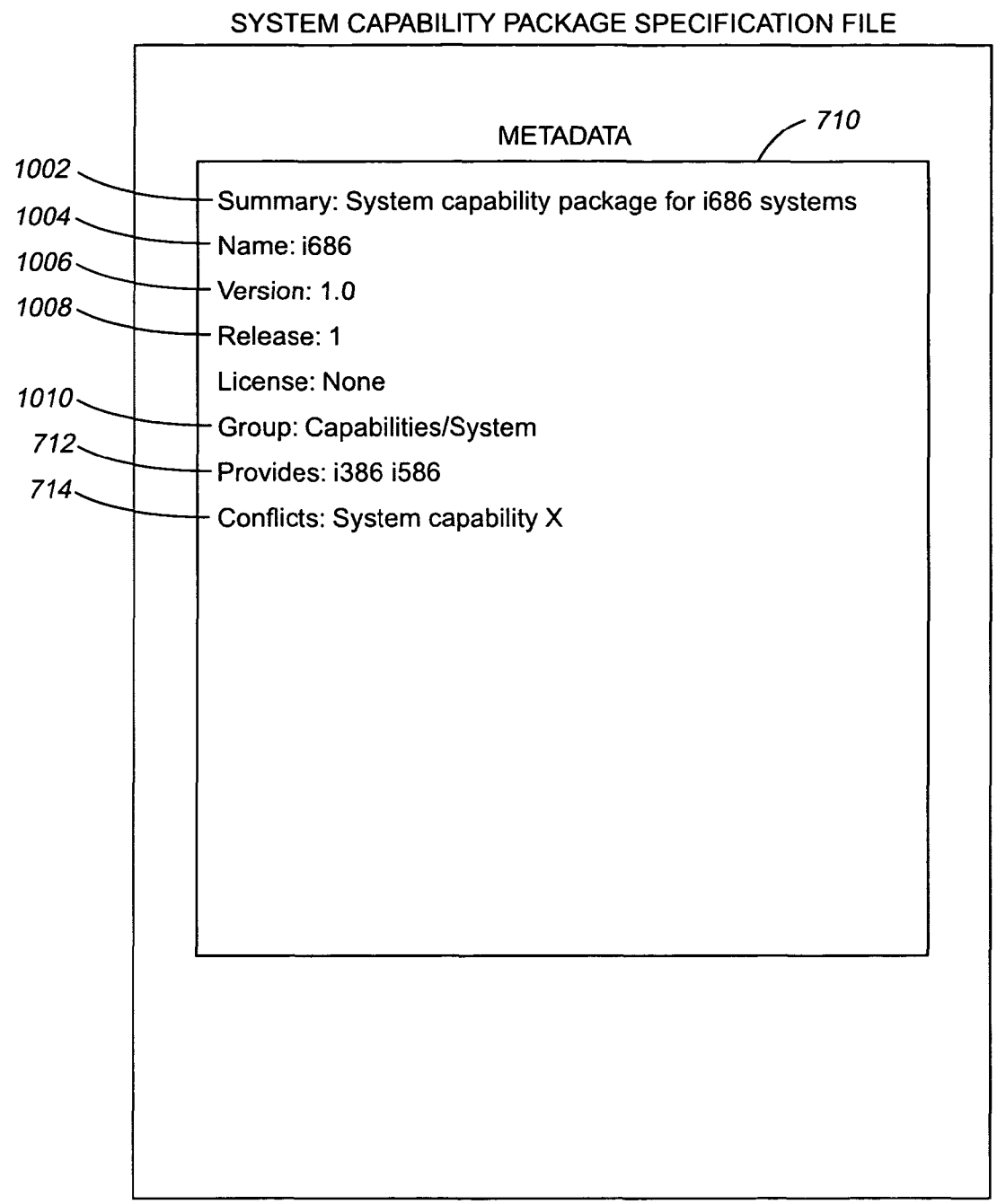
FIG. 10 illustrates a more detailed view of a specification file in the system capability package of FIG. 7 according to an embodiment of the present invention.

FIG. 10 shows the system capability specification file 708 in more detail. FIG. 10 shows exemplary metadata 710 for the system capability package 222. The information in the system capability specification file 708 of FIG. 10 is only a portion of the information included in the system capability specification file 708 and is not exhaustive. Additionally, the metadata 710 can also vary. The metadata 710 includes summary information 1002, which gives a short description of the system capability package. The name information 1004 defines what the system capability package 222 will actually be called. The version information 1106 is the version of the system capability package 222 and the release information 1008 represents the number of times the system capability, at the present version, has been packaged.

The metadata 710 also includes group information 1010, which defines how the system capability description should be grouped with other packages. The metadata 710 also includes capability information 712, which identifies the system capabilities, for example, the i386 and i586 platforms, described by the system capability package 222. The metadata 708 also includes conflict information 714. The conflict information 714, as described above with respect to FIG. 7, lists other system resources that if running or existing on the present system will cause the installation of the system capability package 222 to fail. For example, if the system capability package 222 represents a Power PC platform (ppc) and System Capability X represents the Sun SPARC (sparc) platform, if system X exists on the current system, the capability/resource described by the system capability package 222 cannot be used.

Exemplary Package Database

FIG. 11 shows a more detailed view of the software package database 410 of FIG. 3. It should be noted that one or more fields may be added to or deleted from the software package database 410 and what is shown is not exhaustive. The software package database 410 includes information regarding all of the packages, for example, software packages, user process packages, and system resource packages installed on the user system1 202. The software package database 410 keeps track of all the files that are changed and created when a package is installed, thereby allowing the software package management system 410 to manage the packages.

The software package database 410 of FIG. 3 includes a package name field 1102 for including the names of each package installed. For example, entries 1104, 1106, 1108 exist identifying Application A, Job X, and System Capability A. A package version field 1110 includes entries 1112, 114, 1116 identifying, for example, the version of the application, job, and system capability identified under the name field 1102. A package size field 1118 comprises entries 1120, 1122, 1124 indicating the size of each package in the software package database 410. A license cost field 1126 includes entries 1128 indicating the licensing cost of each application installed on the user system1 202.

The software package database 410 also includes a dependency field 1130 listing the requirements/dependencies of each package installed on the user system1 202. For example, entry 1132 indicates that Application A requires Application B version 3.5 or above to also be installed. Job X requires Application A and Job Z to be installed. A conflicts field 1134 includes entries indicating the software and/or hardware that would cause the respective package to be installed improperly. For example, a conflict entry 1136 for Application A indicates that Application F with a version below version 1.0 conflicts with Application A. A conflict entry 1138 for Job X indicates that Application B and Job Y conflict with Job X. A conflict entry 1140 for System Capability A indicates that System Capability X conflicts with System Capability A.

As discussed above with respect to FIGS. 6 and 7, a user process package 214 and a system capability package 222 comprise a format similar to the software package 328. Therefore, each of these types of packages can be added into the software package database 410 to be managed by the software package management system 326.

Dependency Diagram

Figure 12:
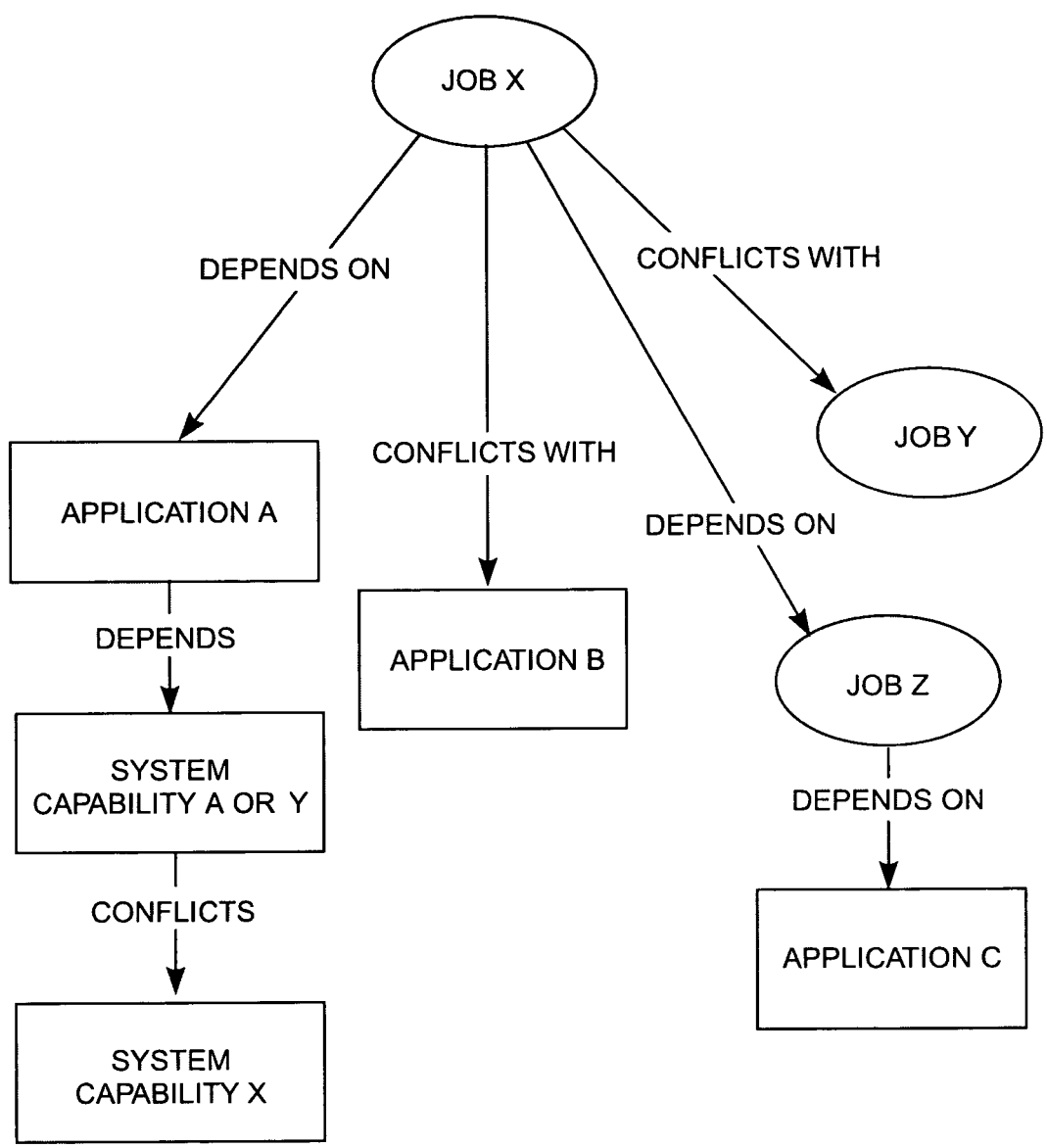
FIG. 12 is a relational diagram showing the dependency/conflict, relationship between applications, user processes, and system capability packages according to an embodiment of the present invention.

FIG. 12 is a dependency diagram showing the interdependent relationships between applications, user processes, and system capabilities, according to an embodiment of the present invention. As shown, Job X depends on Application A and conflicts with Application B. Job X also depends on Job Z and conflicts with Job Y. Application A depends on system capability A or Y and conflicts with System Capability X. Job Z depends on Application C. By compiling user processes and system capabilities into a package format consistent with the structure of a software package, the advantages of existing tools for managing software packages can be utilized with respect to user processes and system capabilities.

Process for Installing a User Process (Job) Package

Figure 13:
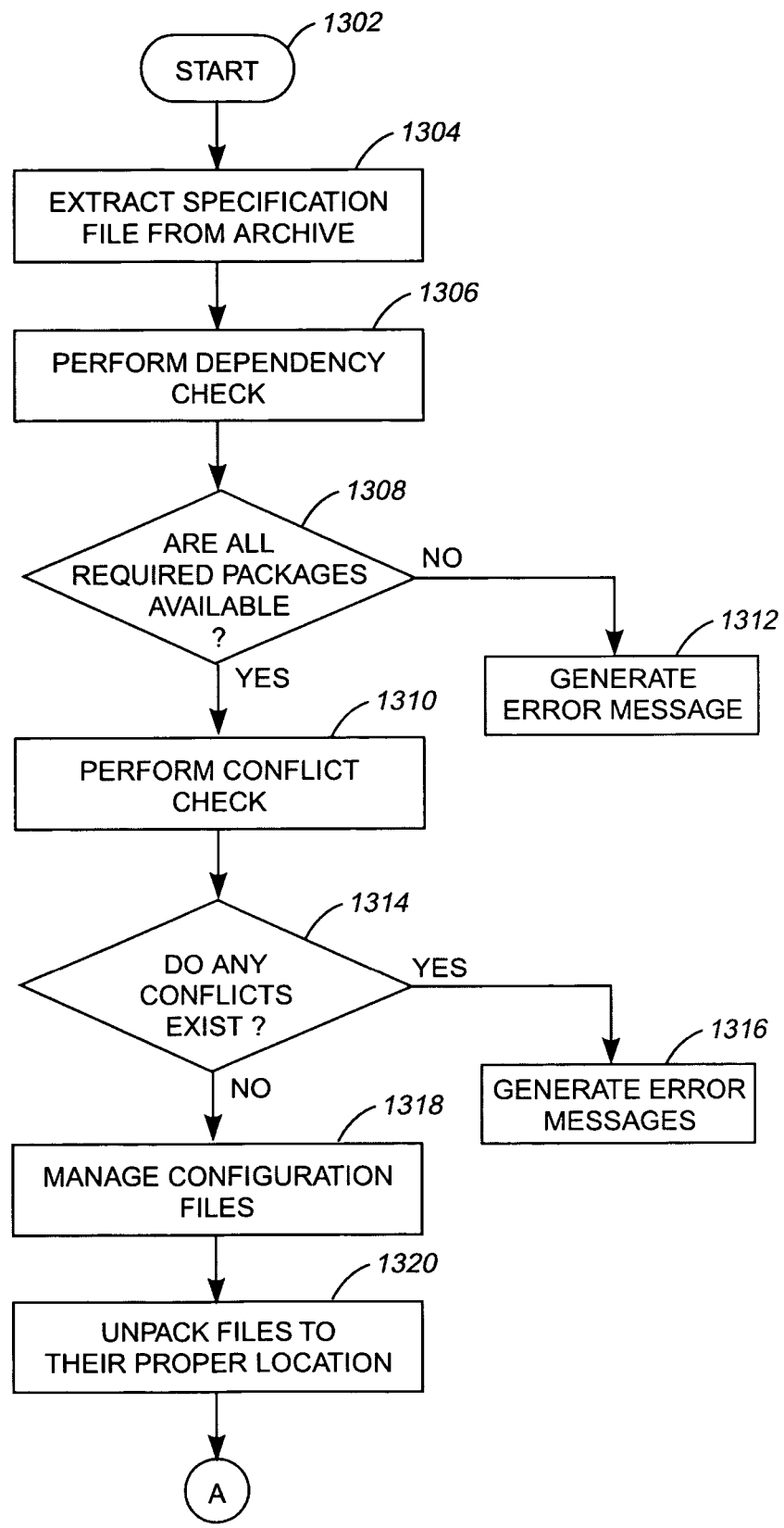
FIG. 13 is an operational flow diagram illustrating the process of installing a system/user process package according to an embodiment of the present invention.
Figure 14:
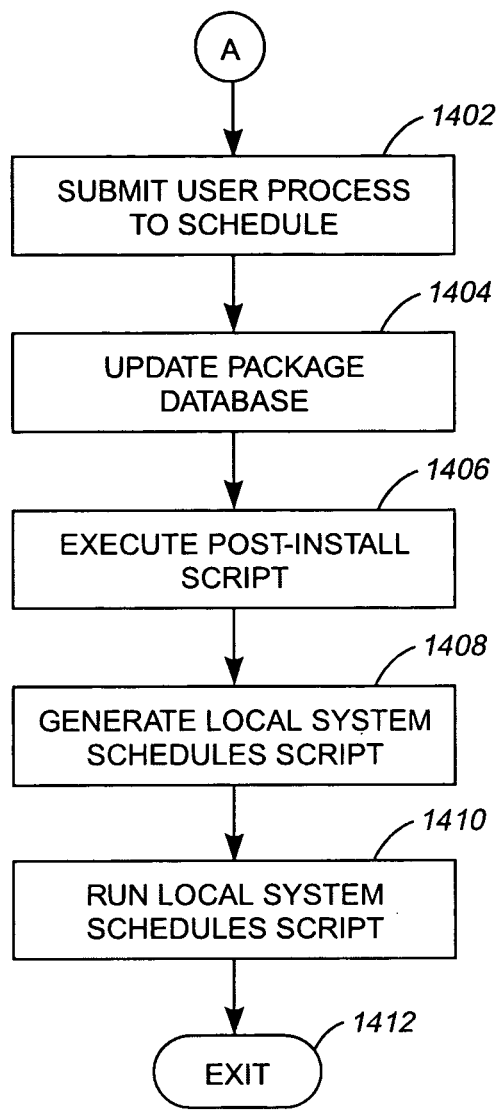
FIG. 14 is an operational flow diagram illustrating the continuation of the installation process of FIG. 13 according to an embodiment of the present invention.

FIG. 13 and FIG. 14 are operational flow diagrams showing the process of installing the user process package 214. The operational flow diagram of FIG. 13 begins at step 1302 and flows directly to step 1304. The user process package 214 can be installed and managed using any software package management system such as RPM, APT, LLP, or the like. The user process package 214 is able to be installed on and managed by any software package management system. The user process specification file 608, at step 1304, is extracted from the archive file 602 of the user process package 214. The software package management system 326, at step 1306, performs a dependency check. The software package management system 326, at step 1308, determines whether all dependencies/requirements are met. If this determination is positive, the software package management system 326, at step 1310, performs a conflicts check. If this determination is negative, an error message, at step 1312, is generated. For example, the software package management system 326 determines whether Application A is installed and Job Z is running. As stated above with respect to FIG. 7, the same format for a traditional software specification file is used for the user process specification file 608. Therefore, traditional software package management systems are able check for dependencies without having to be changed.

The software package management system 326, at step 1314, determines whether any conflicts exist. For example, the software package management system 326 determines whether Application B is installed and whether Job Y is running. If this determination is positive, an error message, at step 1316, is generated. If this determination is negative, the configuration files, at step 1318, are managed during a pre-installation stage. For example, any basic setup that is necessary for the user process/job to run such as creating directories, setting environment variables, copying required files, and the like is performed. The software package management system 326, at step 1320, extracts the data files 604, 606 to a specified directory in storage 308 so that they are available to the user process/job when it is executed. The control flow continues to step 1402 of FIG. 14.

The user process/job is automatically submitted, at step 1402, to the local system's job scheduler (not shown). For example, in one embodiment, the user process is submitted to a batch scheduler. At this point, the user process/job is "installed" and the software package database 410, at step 1404, is updated to include the newly installed user process/job. The post-install script 618, at step 1406, is executed, which generates, at step 1408, a local system scheduler script 624. The local system scheduler script 624, for example, begins the execution of the user process/job. The local system scheduler script, at step 1410 is run, and the user process/job begins to execute. In another embodiment, the user process/job is submitted to the local system's job scheduler (not shown) by the post-install script 618. The local system scheduler script 624, in one embodiment, is generated during the pre-installation stage and then moved into place during the installation stage. The control flow then exits at step 1412.

Process for Uninstalling the User Process (Job) Package

Figure 15:
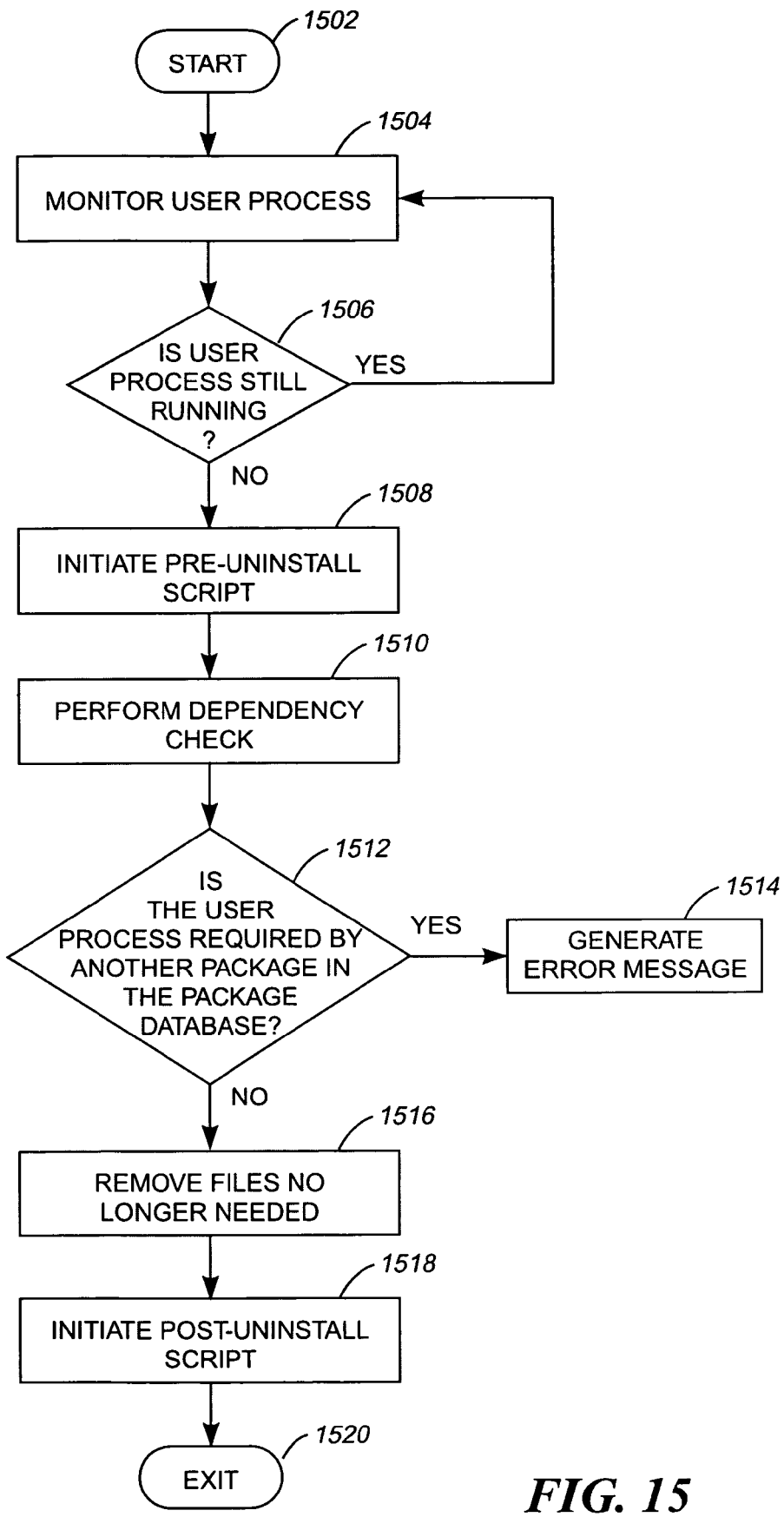
FIG. 15 is an operational flow diagram illustrating the processes of monitoring and uninstalling a user process package according to an embodiment of the present invention.

FIG. 15 is an operational flow diagram showing the process of uninstalling the user process/job. The operational flow diagram of FIG. 15 begins at step 1502 and flows directly to step 1504. As the user process/job is executing, the local system scheduler script 624, which includes a hook for detecting when the user process has completed, monitors, at step 1504, the status of the user process. For example, if the user process is still in the software package database 410 it is still running. If the user process is determined, at step 1506, to be still running, the local scheduler script 624 continues to monitor the user process. If the user process is determined, at step 1506, to have completed its execution, the hook of the local scheduler script 624, at step 1508, initiates the uninstall process. The pre-uninstall script 620 initiates, at step 1510, a dependency check. In another embodiment, the user process (job) as executed includes the end-of-run "hook" If the software package management system 326, at step 1512, determines that the user process/job is required by an existing package in the software package database 410, an error message, at step 1514, is generated. If this determination is negative, any files that were created by the user process/job and the original data files, at step 1516, are automatically uninstalled/removed.

The post-uninstall script, at step 1518, removes any further files that were created by the user process/job and not removed by the pre-uninstall script. The software package database 410 at step 1520, is updated to reflect the uninstallation of the user process/job. In one embodiment, the pre-uninstall and post-uninstall scripts 620, 622 optionally report the results of the user process/job back to the submitter of the user process/job. The control flow then exits at step 1522.

Another advantage of compiling user processes into packages consistent with the structure of a software package is that existing packaging tools can be used to track the runtime state of a specific user process. "Installing" the user process would add the user process to the software package database 410 and automatically submit it to be executed by whatever batch scheduler is in use on the system. The same tools that are used to check the installed state of an application can be used to check the runtime state of the job. Once the use process is no longer installed, the user process has completed. In addition, this serves as a sort of semaphore that signifies that the job is running, which prevents any applications it relies on from being removed from underneath it, thereby providing safe uninstallation of applications.

Also, by compiling a user process into a package consistent with the structure of a software package, the process's complex dependencies and conflicts can be better represented and an environment under which the job will run can be created. User process results also become verifiable and re-creatable. Representing jobs as user packages and tracking the software package database state provides a view of the runtime and application state of the system when the job was executed.

Process for Installing a System Capability Package

Figure 16:
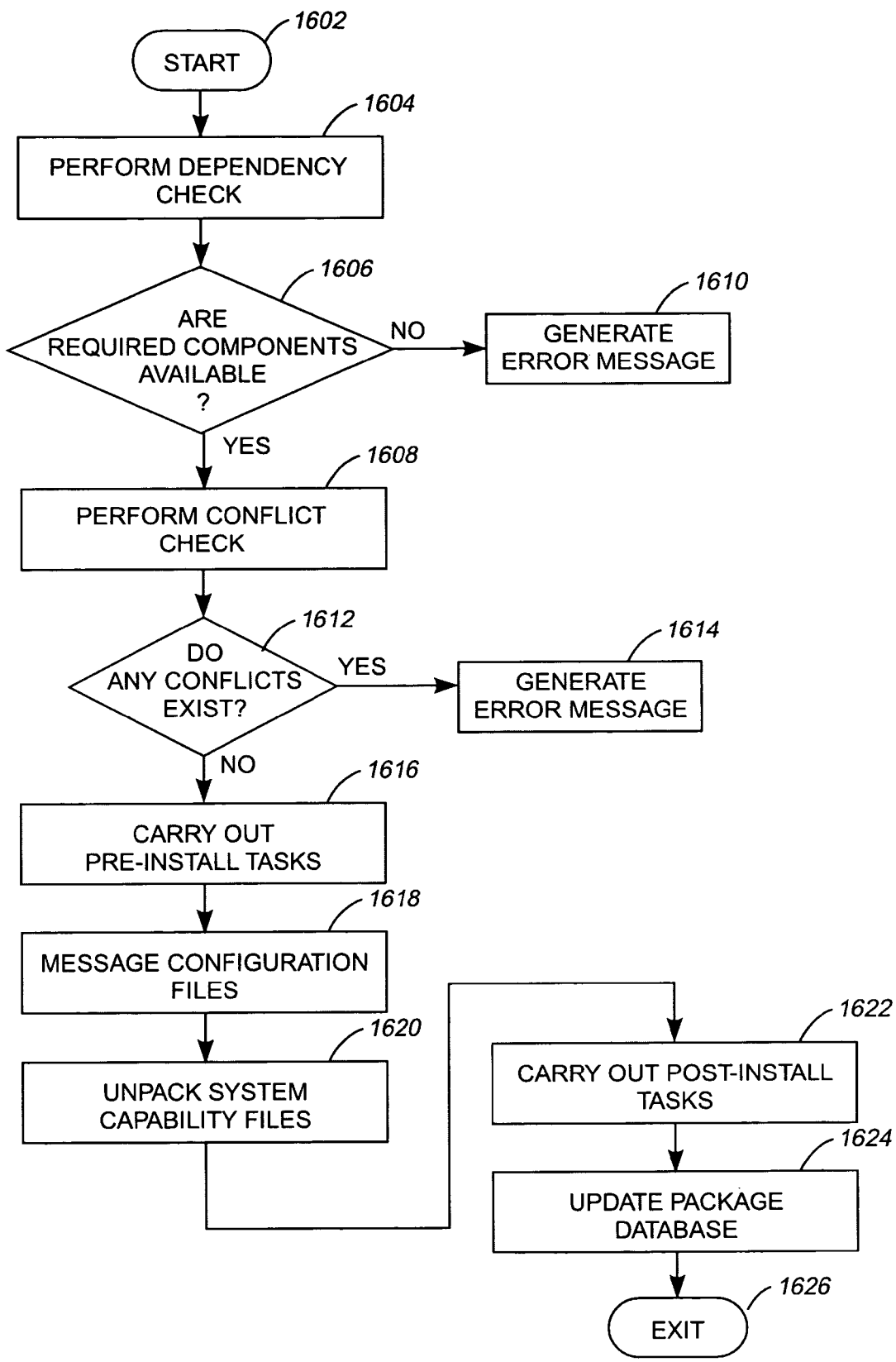
FIG. 16 is an operational flow diagram illustrating the process of installing a system capability package according to an embodiment of the present invention.

FIG. 16 is an operational flow diagram showing an exemplary process of installing the system capability package 222. The operational flow diagram of FIG. 16 begins at step 1602 and flows directly to step 1604. The software package management system 326, at step 1604, performs a dependency check. The software package management system 326, at step 1606, determines whether the required components for the system capability that are described by the system capability package 222 are available. If the result of this determination is positive, the software package management system 326, at step 1608, performs a conflicts check. If the result of this determination is negative, an error message, at step 1610, is generated. The software package management system 326 determines, at step 1612, whether a conflicting system capability/resource exits on the current system. If the result of this determination is positive, an error message, at step 1614 is generated. If the result of this determination is negative, the software package management system 326, at step 1616, carries out pre-install tasks.

A pre-install script is used to execute a script before the actual installation of the script. The software package management system 326, at step 1618, manages configuration files of the system capability package 222. The software package management system 326, at step 1620, unpacks the actual system capability files to their proper locations and set the correct owner and permissions. The software package management system 326, at step 1622, carries out post install tasks. For example, a post-install script is executed if any required tasks are needed to be completed such as starting up a daemon or registering the newly installed system capability/resource. The software package database 410, at step 1624, is updated with information regarding the system capability package 222. The control flow then exits at step 1626. In another embodiment, the system capability package 222 is installed only as metadata information in the software package database 410 and the optional scripts 716, 718, 720, 722 are ignored.

Non-Limiting Examples

The foregoing embodiments of the present invention are advantageous because they provide user processes and represent system capabilities in a software package format allowing, among other things, information about versions of dependencies such as libraries that were used, run-time command options, and the like to be provided in a software package database. Also, describing system capabilities/resources in a software package format allows a software package to be extendable if a new capability is added and allows for a more complete specification of the hardware and software that the software was designed to run on. Additionally, the present invention allows for much finer-grained dependencies in the dependency resolution stage as opposed to runtime checks for capabilities during the install step.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Embodiments of the invention can be implemented as a program product for use with a computer system such as, for example, the computing environment shown in FIG. 1 and described herein. The program(s) of the program product defines functions of the embodiments (including the methods described herein) and can be contained on a variety of computer readable media. Illustrative computer readable medium include, but are not limited to: (i) information permanently stored on non-writable storage medium (e.g., read-only memory devices within a computer such as CD-ROM disk readable by a CD-ROM drive) or (ii) alterable information stored on writable storage medium (e.g., floppy disks within a diskette drive or hard-disk drive). The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for managing software packages by an existing software package management system, the method comprising:
retrieving at least one application comprising an existing software structure, wherein the application is being managed by an existing management system, and wherein the existing software structure comprises a set of application files, a set of specification files, and a set of script files;
creating
a user process package with a list of user processes required to be already running for an installation of the application to succeed on a user system, and
creating a system capability package with a list of conflicts that will cause an installation of the application to fail on a user system,
wherein the user process package and the system capability package are created in a package structure format equivalent to the existing software structure;
placing, in the package structure format, a set of data files defining a user process and a system capability into a location corresponding to a location in the existing software structure maintained for the set of application files, wherein the placing creates interdependencies between the data files, the user process package and the system process package; and
storing the least one of a user process package and a system capability package on an information system being managed by the existing software management system, wherein the storing extends the existing software management system to manage existing software structures with run-time information dependencies.

2. The method of claim 1, further comprising:
analyzing a set of requirements for the user process package and the system capability package;
determining if the set of requirements has been satisfied;
determining if any conflicts associated with the user process and the system process exist; and
generating an error in response to at least one of the set of requirements having not been satisfied and any conflicts exists.

3. The method of claim 1, further comprising:
generating a local scheduler script for submitting the user process and the system process to a process scheduler.

4. The method of claim 1, wherein the user process and the system process has an interdependency on another user process and another system process.

5. The method of claim 1, wherein the user process and the system process has an interdependency on at least one application managed by the existing software management system.

6. The method of claim 4, further comprising:
storing dependency information associated with the user process and the system process in a software package database.

7. The method of claim 1, further comprising:
monitoring the user process and the system process to determine if the user process and the system process is executing; and
preventing removal of at least one installed application in response to the monitoring indicating that the user process and the system process is executing, wherein the at least one installed application is in use by at least one of the user process and the system process.

8. The method of claim 1, further comprising:
extracting the user process defined by the set of data files to a specified directory in a non-volatile memory on the information processing system; automatically submitting the user process to a job scheduler;
updating a software package database managed by the existing software management system to include the user process;
generating a system scheduler script; and
initiating execution of the user process by the system scheduler script.

9. A system for managing software packages by an existing software management system, the system comprising:
a memory;
a processor communicatively coupled to the memory; and
an existing software management system communicatively coupled to the memory and the processor, wherein the existing software management system is configured for:
retrieving at least one application comprising an existing software structure, wherein the application is managed by the existing software management system, and wherein the existing software structure comprises a set of application files, a set of specification files, and a set of script files;
creating a user process package with a list of user processes required to be already running for an installation of the application to succeed on a user system, and
creating a system capability package with a list of conflicts that will cause an installation of the application to fail on a user system,
wherein the user process package and the system capability package are created in a package structure format equivalent to the existing software structure;
placing, in the package structure format, a set of data files defining a user process and a system capability into a location corresponding to a location in the existing software structure maintained for the set of application files, wherein the placing creates interdependencies between the data files, the user process package and the system process package; and
storing the user process package and a system capability package in the memory, wherein the storing extends the existing software management system to manage existing software structures with run-time information dependencies.

10. The system of claim 9, wherein the user process package and the system capability package further comprises conflict information associated with the user process and the system process.

11. The system of claim 9, wherein the existing software management system is further for:
submitting the user process and the system process to a process scheduler.

12. The system of claim 11, wherein the existing software management system is further for:
  monitoring a status of the user process and the system process.

13. A computer program product for managing software packages by an existing software management system, the computer program product comprising:
  a non-volatile memory readable by a processing circuit and storing instructions for execution by the processing circuit for performing a method comprising:
    retrieving at least one application comprising an existing software structure, wherein the application is being managed by an existing software management system, and wherein the existing software structure comprises a set of application files, a set of specification files, and a set of script files;
    creating a user process package with a list of user processes required to be already running for an installation of the application to succeed on a user system, and
    creating a system capability package with a list of conflicts that will cause an installation of the application to fail on a user system,
    wherein the user process package and the system capability package are created in a package structure format equivalent to the existing software structure;
    placing, in the package structure format, a set of data files defining a user process and a system capability into a location corresponding to a location in the existing software structure maintained for the set of application files, wherein the placing creates interdependencies between the data files, the user process package and the system process package; and
    storing the least one of a user process package and a system capability package on an information system being managed by the existing software management system, wherein the storing extends the existing software management system to manage existing software structures with run-time information dependencies.

14. The computer program product of claim 13, wherein the method further comprises:
  analyzing a set of requirements for the user process package and the system capability package;
  determining if the set of requirements has been satisfied;
  determining if any conflicts associated with the user process and the system process exist; and
  generating an error in response to at least one of the set of requirements having not been satisfied and any conflicts exists.

15. The computer program product of claim 13, wherein the method further comprises:
  generating a local scheduler script for submitting the user process and the system process to a process scheduler.

16. The computer program product of claim 13, wherein the user process and the system process depends on another user process and other system process.

17. The computer program product of claim 13, wherein the user process and the system process depends on at least one application managed by the existing software management system.

18. The computer program product of claim 13, further comprising instructions for:
  storing dependency information of the user process and the system process in a software package database.

19. The computer program product of claim 13, wherein the method further comprises:
  monitoring the user process and the system process to determine if the user process and the system process is executing; and
  preventing removal of at least one installed application in response to the monitoring indicating that the user process and the system process is executing, wherein the at least one installed application is in use by at least one of the user process and the system process.

20. The computer program product of claim 13, wherein the method further comprises:
  extracting the user process defined by the set of data files to a specified directory in a non-volatile memory on the information processing system;
  automatically submitting the user process to a job scheduler;
  updating a software package database managed by the existing software management system to include the user process;
  generating a system scheduler script; and
  initiating execution of the user process by the system scheduler script.

* * * * *